United States Patent
Kim et al.

(10) Patent No.: US 10,694,777 B2
(45) Date of Patent: Jun. 30, 2020

(54) METHOD AND APPARATUS FOR MANUFACTURING FLAVOR CAPSULE OF TOBACCO

(71) Applicant: KT & G Corporation, Daedeok-gu Daejeon (KR)

(72) Inventors: Ick Joong Kim, Daejeon (KR); Mi Jeong Bang, Daejeon (KR); Jung Seop Hwang, Daejeon (KR); Sang Jin Nam, Daejeon (KR); Jae Gon Lee, Daejeon (KR); Han Joo Chung, Daejeon (KR)

(73) Assignee: KT & G Corporation, Daedeok-gu, Daejeon (KR)

( * ) Notice: Subject to any disclaimer, the term of this patent is extended or adjusted under 35 U.S.C. 154(b) by 272 days.

(21) Appl. No.: 15/562,705

(22) PCT Filed: Mar. 30, 2016

(86) PCT No.: PCT/KR2016/003246
§ 371 (c)(1),
(2) Date: Sep. 28, 2017

(87) PCT Pub. No.: WO2016/159648
PCT Pub. Date: Oct. 6, 2016

(65) Prior Publication Data
US 2018/0092398 A1    Apr. 5, 2018

(30) Foreign Application Priority Data

Mar. 31, 2015  (KR) .................. 10-2015-0045122
Mar. 31, 2015  (KR) .................. 10-2015-0045125

(51) Int. Cl.
| | |
|---|---|
| *A61L 9/04* | (2006.01) |
| *A61K 8/00* | (2006.01) |
| *A24D 3/02* | (2006.01) |
| *A24D 3/06* | (2006.01) |
| *A24D 3/04* | (2006.01) |
| *A24D 3/16* | (2006.01) |

(52) U.S. Cl.
CPC ........... *A24D 3/0216* (2013.01); *A24D 3/061* (2013.01); *A24D 3/062* (2013.01); *A24D 3/067* (2013.01); *A24D 3/048* (2013.01); *A24D 3/163* (2013.01)

(58) Field of Classification Search
CPC ...... A24D 3/0216; A24D 3/062; A24D 3/163; A24D 3/061; A24D 3/067
USPC ......................................................... 512/4, 1
See application file for complete search history.

(56) References Cited

U.S. PATENT DOCUMENTS

| | | | |
|---|---|---|---|
| 5,581,446 | A | 12/1996 | Sanpei et al. |
| 2009/0050163 | A1 | 2/2009 | Hartmann et al. |
| 2011/0271968 | A1 | 11/2011 | Carpenter et al. |
| 2016/0021927 | A1 | 1/2016 | Kondo |

FOREIGN PATENT DOCUMENTS

| | | | | |
|---|---|---|---|---|
| CN | 101203148 | A | 6/2008 | |
| CN | 102106607 | A | 6/2011 | |
| CN | 104305521 | * | 1/2015 | |
| CN | 104812256 | A | 7/2015 | |
| EP | 0513603 | A1 * | 11/1992 | ............... A61J 3/07 |
| EP | 0513603 | A1 | 11/1992 | |
| EP | 1906775 | | 4/2008 | |
| EP | 2997837 | A1 | 3/2016 | |
| JP | 04-338230 | A | 11/1992 | |
| JP | 08-010313 | A | 1/1996 | |
| JP | 2001-009267 | A | 1/2001 | |
| JP | 2002-213083 | A | 7/2002 | |
| JP | 2008-546400 | A | 12/2008 | |
| JP | 2009-520930 | A | 5/2009 | |
| JP | 2010-179095 | A | 8/2010 | |
| JP | 2012-001553 | A | 1/2012 | |
| JP | 2013-142551 | A | 7/2013 | |
| JP | 5351855 | B2 | 11/2013 | |
| JP | 5581446 | B1 | 8/2014 | |
| KR | 100230059 | B1 | 11/1999 | |
| KR | 1020080022127 | A | 3/2008 | |
| KR | 1020110007081 | A | 1/2011 | |
| KR | 10-2015-0140624 | A | 12/2015 | |
| RU | 2009104153 | A | 8/2010 | |
| RU | 2415618 | C2 | 4/2011 | |
| WO | 2006/136197 | A1 | 12/2006 | |
| WO | 2007/010407 | A2 | 1/2007 | |
| WO | 2010/146845 | A1 | 12/2010 | |
| WO | 2014/170947 | A1 | 10/2014 | |

(Continued)

OTHER PUBLICATIONS

Gao et al, CN 104305521 Machine Translation, Jan. 28, 2015 (Year: 2015).*
Japanese Decision to Grant for Japanese Application No. 2018-501843, dated Apr. 12, 2019, 5 pages with English Translation.
Japanese Notice of Reasons for Refusal for Japanese Application No. 2018-501843, dated Aug. 29, 2018, 12 pages with English Translation.
Chinese First Office Action for Chinese Application No. 201680019754, dated Jun. 17, 2019, 26 pages with English Translation.

(Continued)

*Primary Examiner* — Jessica Whiteley
(74) *Attorney, Agent, or Firm* — TraskBritt

(57) ABSTRACT

A method for manufacturing a flavor capsule of tobacco according to an embodiment of the present disclosure may comprise: a membrane manufacturing step for manufacturing a membrane of a flavor capsule by a membrane manufacturing part that manufactures a membrane; a capsule manufacturing step for manufacturing the flavor capsule using an apparatus for manufacturing a capsule with the membrane manufactured during the membrane manufacturing step and a flavored liquid to be held in the membrane; and a hardening step for hardening the flavor capsule.

11 Claims, 6 Drawing Sheets

(56) References Cited

FOREIGN PATENT DOCUMENTS

WO 2014/171433 A1 10/2014

OTHER PUBLICATIONS

Meng Fanzhi EDS, "Newly Compiled Fine Chemical Application Formula 10000 Cases and Production Process Practical Manual", Silver Sound Press, ISBN 7883623982, (May 2004), 11 pages (9 Pages of Original Copy and 2 Pages of Partial English Translation).
International Search Report for International Application No. PCT/KR2016/003246 dated Jun. 27, 2016, 5 pages.
International Written Opinion for International Application No. PCT/KR2016/003246 dated Jun. 27, 2016, 11 pages.

\* cited by examiner

METHOD AND APPARATUS FOR MANUFACTURING FLAVOR CAPSULE OF TOBACCO

CROSS-REFERENCE TO RELATED APPLICATIONS

This application is a national phase entry under 35 U.S.C. § 371 of International Patent Application PCT/KR2016/003246, filed Mar. 30, 2016, designating the United States of America and published as International Patent Publication WO 2016/159648 A1 on Oct. 6, 2016, which claims the benefit under Article 8 of the Patent Cooperation Treaty to Korean Patent Application Serial Nos. 10-2015-0045122 and 10-2015-0045125, both filed Mar. 31, 2015.

TECHNICAL FIELD

Example embodiments relate to a method and apparatus for manufacturing a flavor capsule of a cigarette and, more particularly, to a method and apparatus for manufacturing a flavor capsule of a cigarette that may allow a membrane to be desirably bound to a flavored liquid.

BACKGROUND

In general, to manufacture cigarettes, various types of leaf tobacco are blended and processed to provide desired flavors and tastes to the cigarettes. The processed leaf tobacco is cut and folded to produce a cut tobacco leaf, and the cut tobacco leaf is then rolled with a cigarette paper to produce a filter-free cigarette. As necessary, a filter may be attached to such a filter-free cigarette.

The cigarette paper may be made with, for example, flax, wood pulp, and the like, and a need to be produced to maintain a burning quality and a taste of a cigarette while the cigarette is being smoked. The cigarette filter may include activated carbon, flavoring substances, etc. The cigarette filter may be embodied as a mono-filter or a multi-filter, and wrapped with a cigarette filter wrapping paper. The cut tobacco leaf and the cigarette filter are connected through a tipping paper that includes fine holes.

The cigarette filter may include a flavor capsule containing therein a flavor or incense. Thus, a user may taste the flavor, for example, a menthol flavor, when the flavor capsule is torn during smoking. Here, strength of the flavor capsule is important. For example, the flavor capsule may need to be torn based on a degree of an external force applied by the user during smoking, while also not being torn when the external force is not applied. Thus, there is a desire for a development of a method and apparatus for manufacturing a flavor capsule having a desirable strength.

BRIEF SUMMARY

Technical Goals

Example embodiments provide a method and apparatus for manufacturing a flavor capsule of a cigarette that may improve efficiency in a process of manufacturing the flavor capsule by manufacturing a membrane and manufacturing the flavor capsule through a series of processes, and may manufacture the membrane to be desirably bound to a flavored liquid, thereby preventing the flavor capsule from being randomly torn to achieve stability and provide a user with reliability by tearing the flavor capsule only when an external force is applied by the user.

Example embodiments also provide a method and apparatus for manufacturing a flavor capsule of a cigarette that may have a dual discharge structure in which a flavored liquid and a membrane are discharged through respective discharge paths and, thus, an initial form of the flavor capsule is formed when the flavored liquid and the membrane are discharged through the respective discharge paths, thereby improving efficiency in a process of manufacturing the flavor capsule.

Example embodiments also provide a method and apparatus for manufacturing a flavor capsule of a cigarette that may maintain an appropriate viscosity and temperature of a membrane during a process of manufacturing and transferring the membrane, and thus secure production stability and formability of the flavor capsule.

Technical Solutions

According to an example embodiment, there is provided a method of manufacturing a flavor capsule of a cigarette, the method including manufacturing a membrane of the flavor capsule by a membrane manufacturer configured to manufacture a membrane, manufacturing the flavor capsule by an apparatus for manufacturing the flavor capsule using the manufactured membrane and a flavored liquid to be contained in the membrane, and hardening the flavor capsule. Through such a series of processes of manufacturing the membrane and manufacturing the flavor capsule, efficiency in the method of manufacturing the flavor capsule may be improved, and also the flavor capsule may be manufactured to allow the membrane to be desirably bound to the flavored liquid. Thus, a random tearing of the flavor capsule may be prevented to improve stability, and also the flavor capsule may be torn only when an external force is applied by the user to provide the user with reliability of use.

The manufacturing of the membrane may include weighing an amount of each substance included in the membrane, and forming the membrane by dissolving each of the substances included in the membrane.

The substances included in the membrane and to be weighed may include agar, pectin, glycerin, and sodium alginate. A weight percentage of the agar may be 1.5% to 3.0%; a weight percentage of the pectin may be 1% to 3%; a weight percentage of the glycerin may be 2.0% to 10.0%; and a weight percentage of the sodium alginate may be 0.2% to 0.7%.

In forming the membrane, the agar may be injected into hot water and dissolved therein, the glycerin may be dissolved therein, the pectin may be dissolved therein, and then the sodium alginate may be dissolved therein.

In forming the membrane, the agar may be dissolved in the hot water at a temperature of 85° C. to 100° C.; the glycerin may be dissolved in the hot water in which the agar is dissolved at a temperature of 80° C. to 85° C.; the pectin may be dissolved in the hot water in which the agar and the glycerin are dissolved at a temperature of 80° C. to 85° C.; and the sodium alginate may be dissolved in the hot water in which the agar, the glycerin, and the pectin are dissolved at a temperature of 75° C. to 80° C.

The manufacturing of the membrane may further include measuring a viscosity of the formed membrane to check whether the viscosity of the formed membrane is within a set range of 500 centipoise (cps) to 650 cps.

The manufacturing of the membrane may further include transferring the formed membrane to a membrane tank of the apparatus for manufacturing the flavor capsule.

The apparatus for manufacturing the flavor capsule may include the membrane tank in which the membrane is stored, a flavored liquid tank in which the flavored liquid is stored, and a coolant tank in which a coolant is stored; a membrane supply line connected to the membrane tank, a flavored liquid supply line connected to the flavored liquid tank, and a coolant supply line connected to the coolant tank; a nozzle connected to the membrane supply line and the flavored liquid supply line and configured to form an initial form of the flavor capsule by discharging the membrane and the flavored liquid such that the membrane wraps the flavored liquid; and a flavor capsule transfer line connected to the nozzle to transfer the flavor capsule discharged from the nozzle by each unit, and connected to the coolant supply line to allow the flavor capsule to be transferred by the coolant supplied by the coolant supply line. The manufacturing of the flavor capsule may include supplying the membrane, the flavored liquid, and the coolant through the supply lines, forming the flavor capsule by allowing the flavored liquid to be wrapped by the membrane by the nozzle, and transferring the flavor capsule to a capsule storage using a flow of the coolant formed along the flavor capsule transfer line.

Forming the flavor capsule may further include defoaming air bubbles from the manufactured membrane before the supplying step.

In the supplying step, a steady velocity of the flavored liquid, the membrane, and the coolant may be changed in an order of the flavored liquid, the membrane, and the coolant, starting from the flavored liquid.

The hardening may include hardening the flavor capsule by mixing the formed flavor capsule with a prepared ethanol (EtOH) solution.

The prepared EtOH solution may include 70% to 100% ethanol, and the mixing may be performed by mixing the flavor capsule and the prepared EtOH solution at a ratio of one to one (1:1) to one to two (1:2).

The method may further include drying the flavor capsule using a dryer after the hardening.

The method may further include additionally hardening the flavor capsule to prevent moisture absorption after the drying.

In the additional hardening of the flavor capsule, an EtOH solution may be prepared by mixing ethanol and distilled water at a ratio of four to six (4:6) to seven to three (7:3), and the distilled water may include 0.1% to 5.0% calcium chloride.

The method may further include cleaning, by a stirring cleaner, the additionally hardened flavor capsule.

The method may further include sorting, by a size sorter, the cleaned flavor capsule, and packing the sorted flavor capsule.

According to another example embodiment, there is provided a method of manufacturing a flavor capsule of a cigarette, the method including forming, by a capsule manufacturer configured to manufacture a flavor capsule, the flavor capsule using a membrane and a flavored liquid to be contained in the membrane, performing first hardening on the flavor capsule, drying the flavor capsule by a dryer, and performing second hardening on the flavor capsule to additionally harden the flavor capsule to prevent moisture absorption.

In the performing of the first hardening, the flavor capsule may be hardened by mixing the formed flavor capsule with a prepared EtOH solution. The prepared EtOH solution may include 70% to 100% ethanol, and the mixing may be performed by mixing the flavor capsule and the prepared EtOH solution at a ratio of one to one (1:1) to one to two (1:2).

In performing the second hardening, an EtOH solution may be prepared by mixing ethanol and distilled water at a ratio of four to six (4:6) to seven to three (7:3), and the distilled water may include 0.1% to 5.0% calcium chloride.

According to still another example embodiment, there is provided an apparatus for manufacturing a flavor capsule of a cigarette, the apparatus including a membrane tank configured to store a membrane, a flavored liquid tank configured to store a flavored liquid, a coolant tank configured to store a coolant, a nozzle connected to the membrane tank and the flavored liquid tank through respective supply lines and configured to form the flavor capsule by discharging the membrane transferred from the membrane tank and the flavored liquid transferred from the flavored liquid tank such that the membrane wraps the flavored liquid, a flavor capsule transfer line connected to the nozzle to transfer the flavor capsule discharged from the nozzle by each unit, and connected to a coolant supply line configured to supply the coolant to allow the flavor capsule to be transferred by the coolant supplied by the coolant supply line, and a capsule storage configured to store the flavor capsule transferred, while being cooled, from the flavor capsule transfer line.

The apparatus may further include a capsule separator provided between the capsule storage and the flavor capsule transfer line to transfer, to the capsule storage, the flavor capsule transferred from the flavor capsule transfer line, and configured to temporarily store the coolant.

The coolant tank and the capsule separator may be connected through a connection line, and the coolant may be transferred from the capsule separator to the coolant tank to form a circulation structure.

The coolant may be a medium-chain triglyceride (MCT) solution, and the coolant tank may include a cooler to cool the MCT solution.

The membrane tank and the nozzle may be connected through a membrane supply line, and a viscosity of the membrane at a time of manufacturing the membrane may be 300 cps to 700 cps, a temperature of the membrane tank may be 55° C. to 75° C., and a temperature of the membrane supply line and the nozzle may be 55° C. to 75° C.

Alternatively, the viscosity of the membrane at a time of manufacturing the membrane may be 500 cps to 650 cps, and the temperature of the membrane tank may be 60° C. to 65° C., the temperature of the membrane supply line and the nozzle may be 60° C. to 70° C., and a viscosity of the membrane discharged from a tank of a membrane manufacturer configured to manufacture the membrane may be 400 cps to 550 cps.

According to yet another example embodiment, there is provided a nozzle configured to discharge a membrane supplied by a membrane tank and a flavored liquid supplied by a flavored liquid tank such that the membrane wraps the flavored liquid to form an initial form of a flavor capsule, the nozzle including a nozzle body, a flavored liquid discharge line formed along a center of the nozzle body and configured to form a path to discharge the flavored liquid, and a membrane discharge line formed in an outer side of the flavored liquid discharge line in the nozzle body and configured to form a path to discharge the membrane.

The membrane discharge line may be provided as a plurality of membrane discharge lines disposed at equidistant intervals along a circumferential direction of the nozzle body in the outer side of the flavored liquid discharge line.

The flavored liquid discharge line and the membrane discharge line in the nozzle body may, respectively, include jets, and respective diameters of the flavored liquid discharge line and the membrane discharge line may decrease toward the jets.

An inner diameter and an outer diameter of the flavored liquid discharge line in the nozzle body may be determined based on a size of the flavor capsule. The inner diameter may be 0.5 millimeters (mm) to 2.0 mm and the outer diameter may be 2.0 mm to 5.0 mm. The inner diameter may be 20% to 40% of a diameter of the flavor capsule, and a ratio of the inner diameter to the outer diameter may be two and one half to five (2.5:5).

The diameter of the flavor capsule may be 2.1 mm to 4.7 mm, and a thickness of the membrane wrapping the flavored liquid in the flavor capsule may be 0.50 mm to 0.80 mm immediately after the flavor capsule is formed.

Advantageous Effects

According to example embodiments described herein, manufacturing a membrane and manufacturing a flavor capsule may be performed in a series of processes, and thus efficiency in a method of manufacturing the flavor capsule may be improved. In addition, the flavor capsule may be manufactured to allow the membrane to be desirably bound to a flavored liquid to prevent the flavor capsule from being randomly torn, thereby achieving stability and providing a user with reliability by tearing the flavor capsule only when an external force is applied by the user.

In addition, a dual discharge structure in which the flavored liquid and the membrane are discharged through respective discharge paths may be provided to form an initial form of the flavor capsule when the flavored liquid and the membrane are discharged through the respective discharge paths, thereby improving efficiency in the method of manufacturing the flavor capsule.

Further, an appropriate viscosity and temperature of the membrane may be maintained during a process of manufacturing and transferring the membrane and, thus, production stability and formability of the flavor capsule may be achieved.

DETAILED DESCRIPTION

Figure 1:
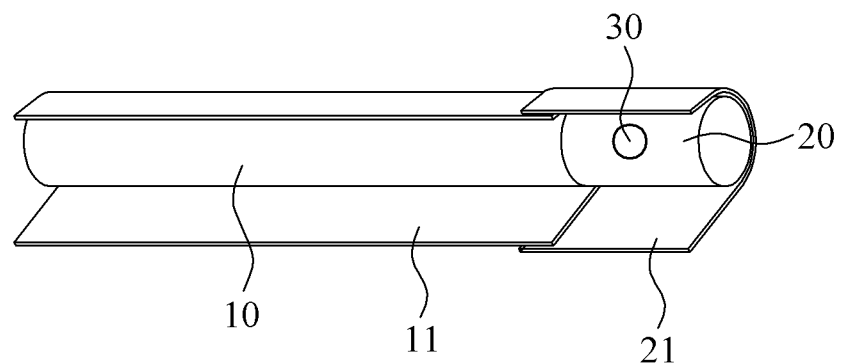
FIG. 1 is a perspective view illustrating an example of a cigarette according to an example embodiment.

Hereinafter, example embodiments will be described in detail with reference to the accompanying drawings, wherein like reference numerals refer to like elements throughout. The following description relates to one aspect among various aspects of the present disclosure, and it constitutes a portion of the detailed description of the present disclosure.

In the description of the example embodiments, detailed description of well-known related structures or functions will be omitted when it is deemed that such description will cause ambiguous interpretation of the present disclosure.

FIG. 1 is a perspective view illustrating an example of a cigarette according to an example embodiment.

Referring to FIG. 1, a cigarette 1 of a general type includes a cut tobacco leaf portion 10, a filter portion 20 connected to a rear end of the cut tobacco leaf portion 10, a cigarette paper 11 wrapping the cut tobacco leaf portion 10, and a filter wrapping paper 21 wrapping the rear end of the cut tobacco leaf portion 10 and the filter portion 20. In addition, a flavor capsule 30 is accommodated or contained in the filter portion 20.

Through such a configuration described in the foregoing, a user may taste a flavored liquid contained in the flavor capsule 30 by having the flavor capsule 30 torn when the user smokes the cigarette 1.

For example, in a case of the cigarette 1 in which the flavor capsule 30 including a flavored liquid of menthol is embedded in the filter portion 20, the user may smoke the cigarette 1 while tasting a flavor of menthol by having the flavor capsule 30 torn when the user uses the cigarette 1.

The flavor capsule 30 may need to be torn or burst, based on the strength of an external force applied when tearing or bursting the flavor capsule 30, and needs to not be randomly torn or burst when the external force is not applied. The flavor capsule 30 includes a flavored liquid and a membrane wrapping the flavored liquid, and the strength of the membrane wrapping the flavored liquid may also be important to prevent such an unintentional tearing or burst. Hereinafter, a method and apparatus for manufacturing a flavor capsule will be described in greater detail with reference to the accompanying drawings.

Figure 2:
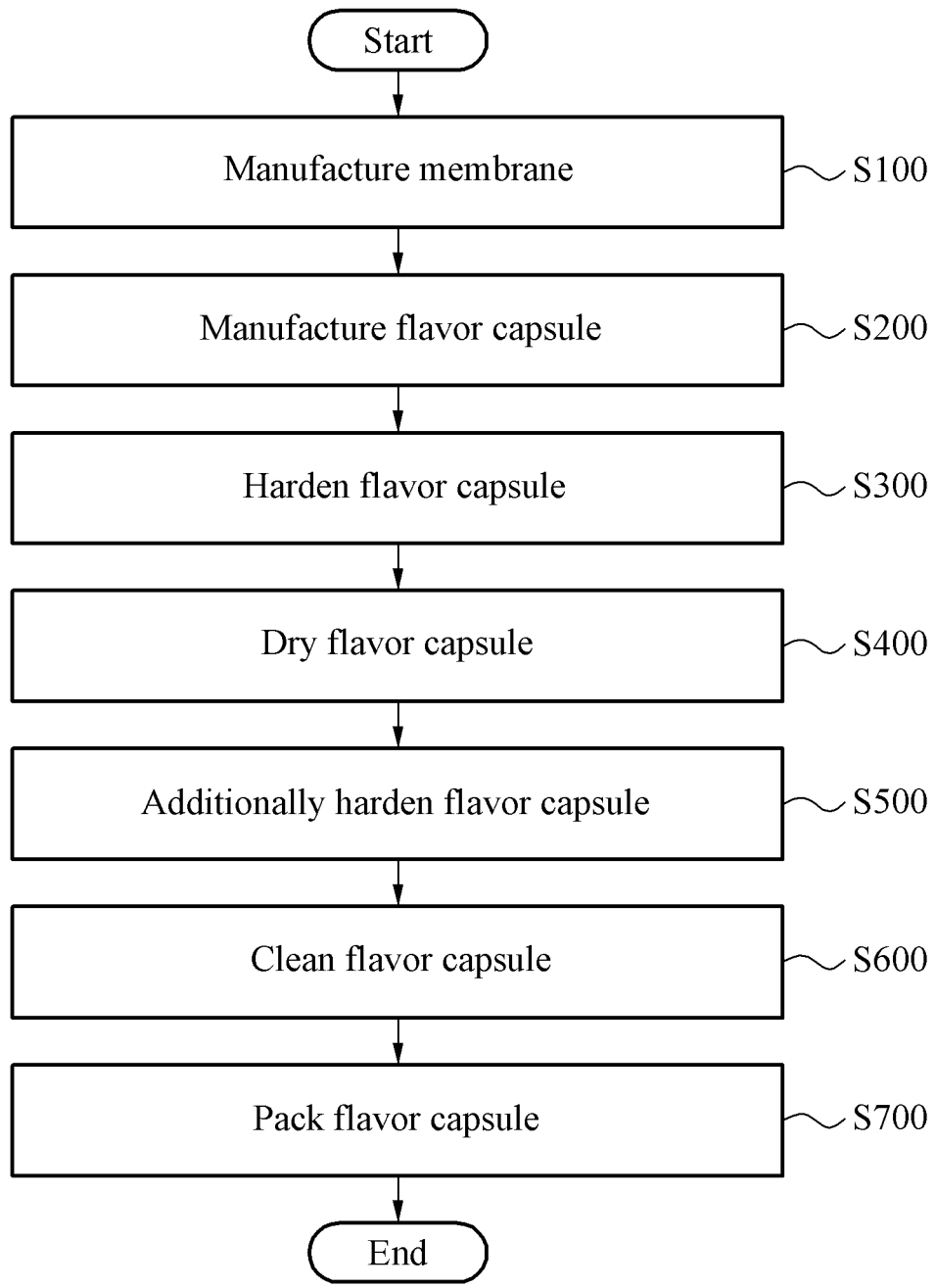
FIG. 2 is a flowchart illustrating an example of a method of manufacturing a flavor capsule of a cigarette according to an example embodiment.
Figure 3:
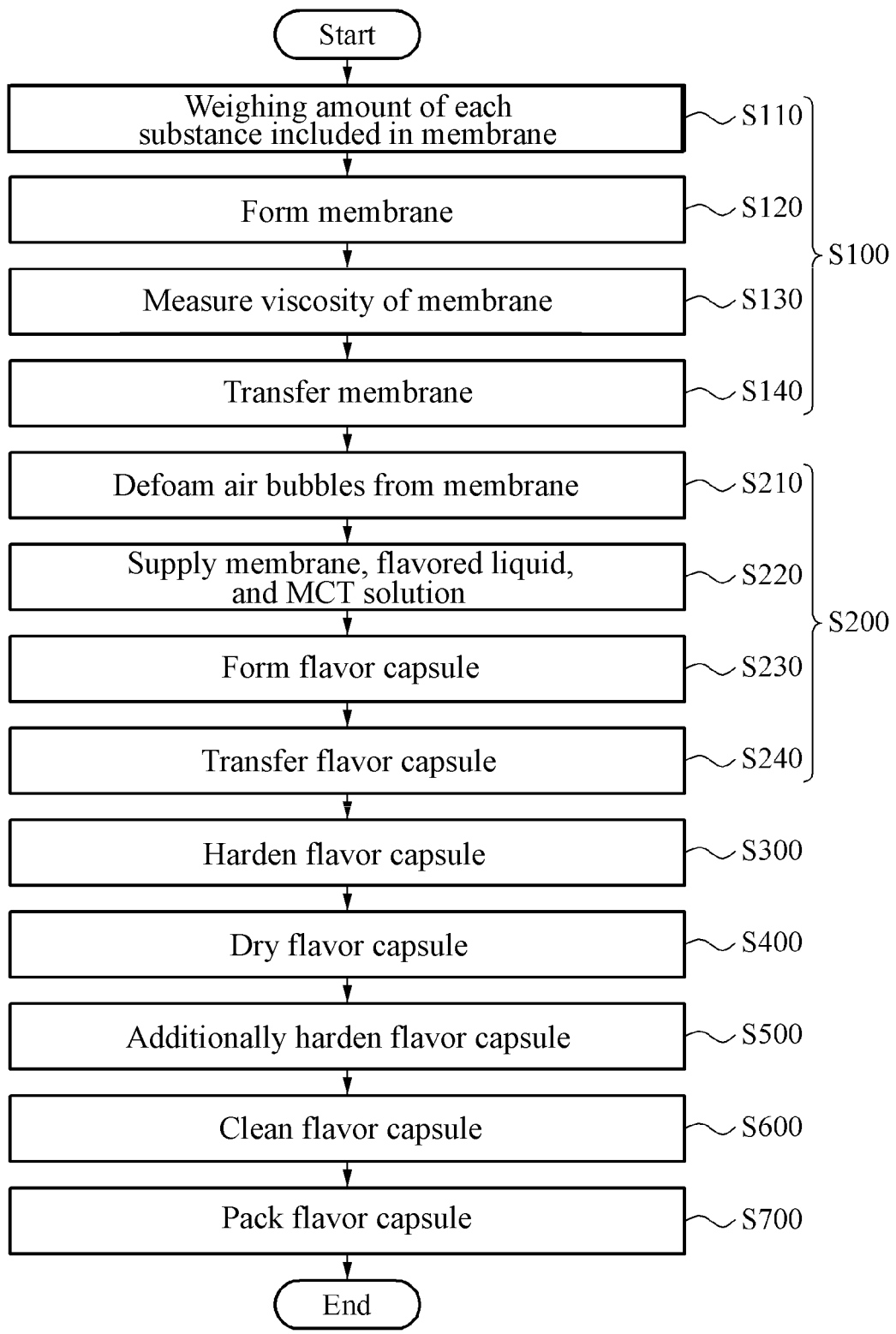
FIG. 3 is a flowchart illustrating a detailed example of the method of manufacturing a flavor capsule of a cigarette of FIG. 2.
Figure 4:
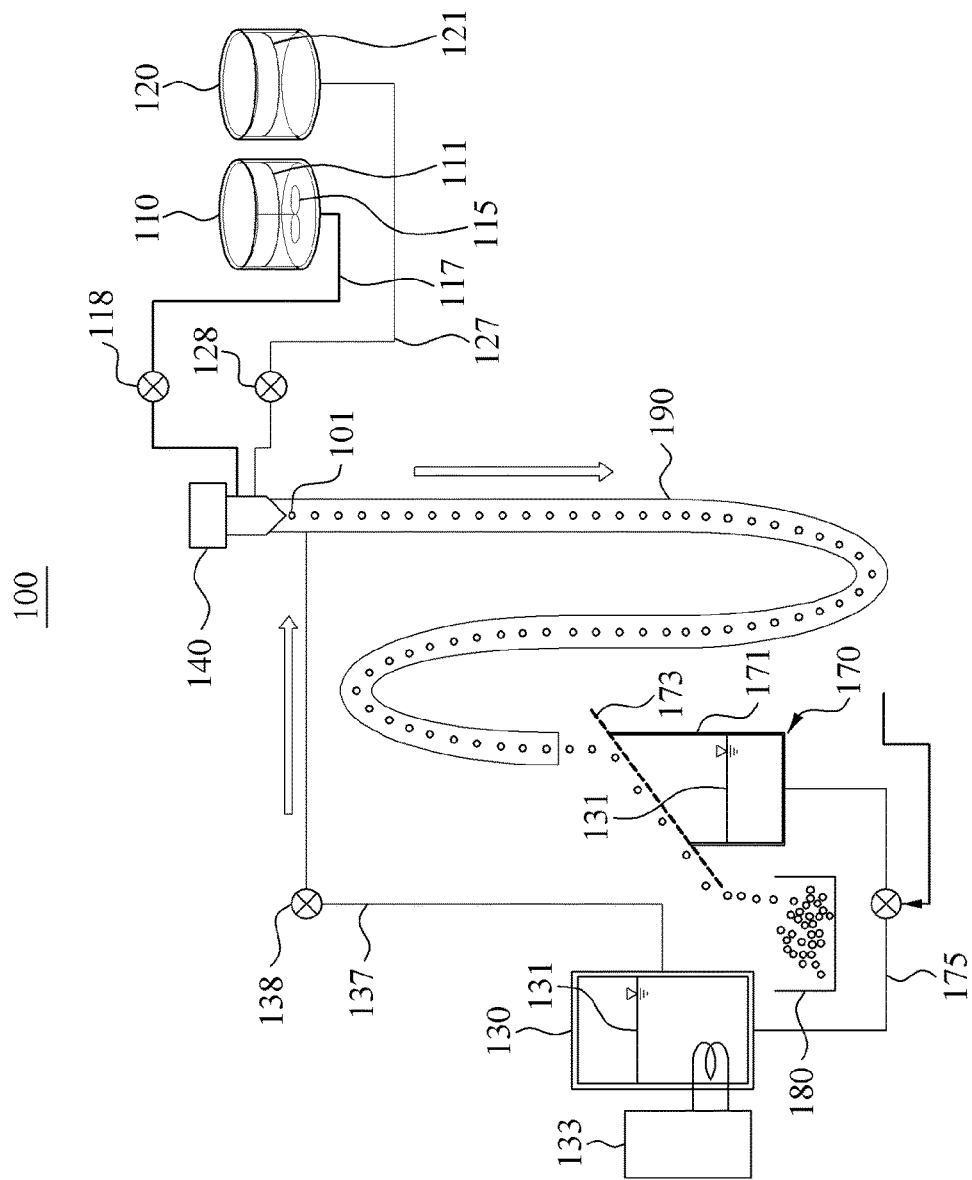
FIG. 4 is a diagram illustrating an example of an apparatus for manufacturing a flavor capsule of a cigarette according to an example embodiment.
Figure 5:
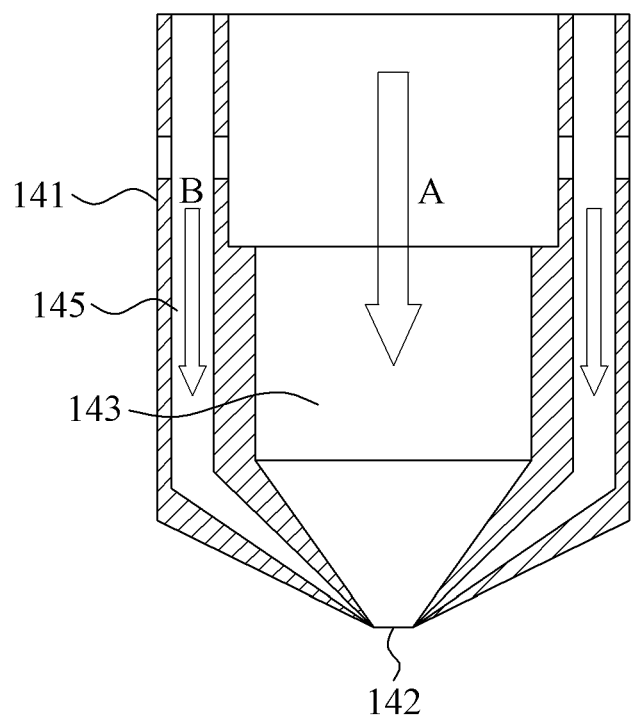
FIG. 5 is a cross-sectional view illustrating an example of a nozzle of FIG. 4 cut in a vertical direction.
Figure 6:
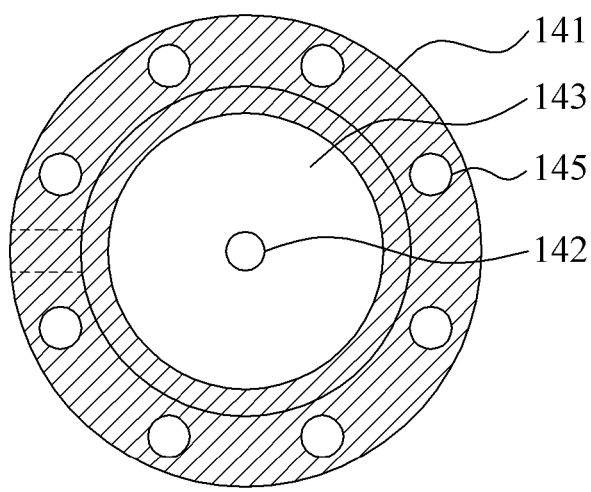
FIG. 6 is a cross-sectional view illustrating an example of the nozzle of FIG. 4 cut in a horizontal direction.

FIG. 2 is a flowchart illustrating an example of a method of manufacturing a flavor capsule of a cigarette according to an example embodiment. FIG. 3 is a flowchart illustrating a detailed example of the method of manufacturing a flavor capsule of a cigarette of FIG. 2. FIG. 4 is a diagram illustrating an example of an apparatus for manufacturing a flavor capsule of a cigarette according to an example embodiment. FIG. 5 is a cross-sectional view illustrating an example of a nozzle of FIG. 4 cut in a vertical direction, and FIG. 6 is a cross-sectional view illustrating an example of the nozzle of FIG. 4 cut in a horizontal direction.

Referring to FIGS. 2 and 4, a method of manufacturing a flavor capsule of a cigarette, hereinafter simply referred to as a flavor capsule manufacturing method, includes a membrane manufacturing step S100 of manufacturing a membrane 111 by a membrane manufacturer (not shown) configured to manufacture a membrane, a capsule manufacturing step S200 of manufacturing a flavor capsule 101 using the membrane 111 and a flavored liquid 121 to be contained in the membrane 111 by an apparatus for manufacturing a flavor capsule, hereinafter simply referred to as a flavor capsule manufacturing apparatus 100, a hardening step S300 of first hardening the flavor capsule 101, a drying step S400 of drying the hardened flavor capsule 101, an additional hardening step S500 of additionally hardening the dried flavor capsule 101, a cleaning step S600, and a packing step S700.

Through such a configuration described in the foregoing, a reliable flavor capsule may be manufactured, and also efficiency in a manufacturing process may be improved.

Referring to FIGS. 3 and 4, the membrane manufacturing step S100 is performed to manufacture a membrane material wrapping the flavored liquid 121, and includes a weighing step S110 of weighing an amount of each substance included in the membrane 111, a membrane forming step S120 of forming the membrane 111 by dissolving the substances included in the membrane 111, a viscosity measuring step S130 of measuring a viscosity of the formed membrane 111, and a membrane transferring step S140 of transferring the membrane 111 to a membrane tank 110.

In the weighing step S110, a precise weighing system configured to precisely weigh the amount of each of the substances may be used.

In the membrane forming step S120, the membrane 111 may be formed by the membrane manufacturer. Although not illustrated, the membrane manufacturer may include a membrane manufacturing container, a hot water boiler connected to the membrane manufacturing container through a connection line and configured to provide hot water to the membrane manufacturing container by heating up water, and a paddle configured to evenly mix the hot water and the substances in the membrane manufacturing container.

The substances included in the membrane 111 to be weighed in the weighing step S110 may include agar, pectin, sodium alginate, and glycerin as a plasticizer.

In a combination of the substances, the agar may play a role in hardening based on a temperature such that an initial form or shape of the flavor capsule 101 is formed at an initial stage of forming or molding. The pectin may act as an intermediate modifier between the agar and the sodium alginate and act on a degree of the hardening of the agar and on a calcium ion bonding of the sodium alginate, such that the initial form of the flavor capsule 101 is formed, and contributes to improving stability and moisture absorption or hygroscopicity and to forming the membrane 111.

The sodium alginate may be hardened by a calcium ion, and adjust strength of the flavor capsule 101 and form the membrane 111, and also improve hygroscopic stability by such an ionic hardening.

The glycerin may function as a plasticizer, improve formability or moldability of the flavor capsule 101, and provide elasticity to the flavor capsule 101. As an amount of the glycerin increases, the hygroscopic stability may deteriorate over the long term because the glycerin itself is highly hygroscopic, although the elasticity of the flavor capsule 101 increases. Conversely, as an amount of the glycerin decreases, the elasticity of the flavor capsule 101 may be reduced, and thus the flavor capsule 101 may be readily broken by an external factor. Therefore, an appropriate amount of the glycerin may need to be mixed.

Table 1 below illustrates weight percentages of the substances described in the foregoing.

TABLE 1

|  | Weight percentage (%) | Weight (kg) | Injection time (min.) | Mixing time (min.) | Remarks |
| --- | --- | --- | --- | --- | --- |
| Agar | 1.5%–3.0% | 3.75–7.5 | 3–7 | 15–25 | Start at 85° C. to 90° C. |
| Glycerin | 2.0%–10.0% | 5–25 | 1–2 | 1–2 |  |
| Pectin | 1.0%–3.0% | 2.5–7.5 | 3–7 | 5–15 |  |
| Sodium alginate | 0.2%–0.7% | 0.5–1.75 | 3–7 | 5–15 |  |

TABLE 1-continued

|  | Weight percentage (%) | Weight (kg) | Injection time (min.) | Mixing time (min.) | Remarks |
| --- | --- | --- | --- | --- | --- |
| Blue No. 1 | (0.6 g/kg) | (150 g) | 3–7 | 5–15 |  |
| Red No. 40 | (0.12 g/kg) | (30 g) |  |  |  |
| Distilled water | 33.3%–95.3% | 208.25–238.25 |  |  |  |
| Sum | 100% |  |  |  |  |

In a case in which distilled water has a weight percentage of 90% (5% corrected), a weight percentage of the agar may be 1.5% to 3.5%, a weight percentage of the glycerin may be 2.0% to 10.0%, a weight percentage of the pectin may be 1% to 3%, and a weight percentage of the sodium alginate may be 0.2% to 0.7%.

In the membrane forming step S120, hot water heated to be 85° C. to 100° C., or more desirably 88° C., by the hot water boiler that may be supplied to the membrane manufacturing container, and then the agar may be injected to be dissolved in the hot water. Here, the agar may need to be injected gradually or slowly because the agar tends to be massed or lumped and not to be untangled or released when being injected all at once, and a mixer may be used to untangle the agar in the hot water. When the agar is injected, the paddle disposed in the membrane manufacturing container may operate at, for example, 90 revolutions per minute (rpm), and a temperature of the membrane manufacturing container may be monitored when the paddle operates.

For example, when the temperature of the membrane manufacturing container decreases to, for example, 85° C., the glycerin may be injected into the hot water in which the agar is dissolved. When the temperature of the membrane manufacturing container decreases to 83° C., the pectin may then be injected into the hot water to be dissolved therein. When the temperature of the membrane manufacturing container decreases to, for example, 78° C., after a predetermined period of time, for example, 10 minutes, elapses after the pectin is injected, the sodium alginate may be injected into the hot water and dissolved therein. As illustrated in Table 1 above, colorings such as the Blue No. 1 or the Red No. 40 may be injected into the hot water to manufacture the membrane 111.

Additionally, there are numerous factors that may cause a change in the viscosity of the membrane 111.

For example, when weighing the membrane 111, the viscosity may increase in response to an increase in a content of a substance included in the membrane 111 or decrease in response to a decrease in the content of the substance. In addition, there is a titrated dissolution temperature for a substance included in the membrane 111. Thus, when the substance is dissolved at a temperature lower than the titrated dissolution temperature, the substance may not be completely dissolved. Conversely, when the substance is dissolved at a temperature greater than the titrated dissolution temperature, a polymer structure may be broken and the viscosity may decrease, and thus the hygroscopic stability may not be desirable. In addition, when a temperature of the membrane manufacturing container is not maintained to be constant, the viscosity may change.

In a case of the membrane 111 with a low viscosity, a pulsation may be generated in a pump or stability of the flavor capsule 101 may deteriorate due to such factors described in the foregoing. Conversely, in a case of the membrane 111 with a high viscosity, the viscosity may change relatively severely with time, and thus formability and productivity may deteriorate. Thus, when the viscosity of the membrane 111 is out of the set range, it may be necessary to dispose of the whole quantity and newly manufacture the membrane 111 that satisfies a viscosity standard, and thus weighing an amount of a substance included in the membrane 111 and adjusting a titrated temperature when dissolving the substance may need to be precisely controlled.

The membrane transferring step S140 is performed to transfer the membrane 111 of which the viscosity is measured to the membrane tank 110 provided in the flavor capsule manufacturing apparatus 100.

When the membrane 111, manufactured in the membrane manufacturing step S100, is transferred to the membrane tank 110 of the flavor capsule manufacturing apparatus 100, the flavor capsule 101 may be manufactured in the flavor capsule manufacturing apparatus 100. Hereinafter, the flavor capsule manufacturing apparatus 100 will be described first in detail, and the capsule manufacturing step S200 will then be described in detail.

Referring to FIG. 4, the flavor capsule manufacturing apparatus 100 includes the membrane tank 110 configured to store the membrane 111, a flavored liquid tank 120 configured to store the flavored liquid 121, a coolant tank or a medium-chain triglyceride (MCT) tank 130 configured to store a coolant, for example, an MCT solution 131 as illustrated, a nozzle 140 connected to the membrane tank 110 and the flavored liquid tank 120 through a membrane supply line 117 and a flavored liquid supply line 127, respectively, and configured to form the flavor capsule 101, or an initial form of the flavor capsule 101, by discharging the membrane 111 transferred from the membrane tank 110 and the flavored liquid 121 transferred from the flavored liquid tank 120 such that the membrane 111 wraps the flavored liquid 121, a flavor capsule transfer line 190 connected to the nozzle 140 to transfer the flavor capsule 101 discharged from the nozzle 140 by each unit and, more particularly, connected to an MCT supply line 137 configured to supply the MCT solution 131 to allow the flavor capsule 101 to be transferred by the MCT solution 131 supplied by the MCT supply line 137, and a capsule storage 180 configured to store the flavor capsule 101 transferred, while being cooled, by the flavor capsule transfer line 190.

The membrane tank 110 stores the membrane 111 manufactured in the membrane manufacturing step S100, and includes a rotating paddle 115 to maintain a dissolved and uniform state of the membrane 111. The membrane tank 110 is connected to the nozzle 140 through the membrane supply line 117, and thus the membrane 111 in the membrane tank 110 may be supplied to the nozzle 140. In the membrane supply line 117, a gear pump 118 is provided to supply the membrane 111 and opens the membrane tank 110 to smoothly transfer the membrane 111.

As illustrated in FIG. 4, the flavored liquid tank 120 stores the flavored liquid 121. The flavored liquid tank 120 is connected to the nozzle 140 through the flavored liquid supply line 127 that includes a gear pump 128 to supply the flavored liquid 121, and thus the flavored liquid 121 may be smoothly transferred from the flavored liquid tank 120 to the nozzle 140.

The nozzle 140 forms the initial form of the flavor capsule 101, and discharges the membrane 111 flowing in the nozzle 140 to wrap the flavored liquid 121 to form the initial form of the flavor capsule 101.

As illustrated in FIGS. 5 and 6, the nozzle 140 is provided in a dual discharge structure, and thus the nozzle 140 may discharge the initial form of the flavor capsule 101 by allowing the flavored liquid 121 and the membrane 111 that flow in the nozzle 140 to interact with each other.

The nozzle 140 includes a nozzle body 141 forming a basic appearance thereof, a flavored liquid discharge line 143 formed along a center of the nozzle body 141 and configured to form a path through which the flavored liquid 121 is to be discharged, and a membrane discharge line 145 formed in the nozzle body 141 to be disposed in an outer side of the flavored liquid discharge line 143 and configured to form a path through which the membrane 111 is to be discharged.

The nozzle body 141 has a cylindrical shape as a whole, and a lower end portion thereof may become smaller in diameter downward toward the bottom. However, a shape of the nozzle body 141 is not limited to the example shape described in the foregoing.

As illustrated in FIGS. 5 and 6, the flavored liquid discharge line 143 is formed along a center in a longitudinal direction of the nozzle body 141. The flavored liquid discharge line 143 is connected to the flavored liquid tank 120 through the flavored liquid supply line 127, and thus supplies the flavored liquid 121 in a direction, for example, an A direction as illustrated, in which the flavored liquid discharge line 143 is formed. A lower end portion of the flavored liquid discharge line 143 becomes smaller in diameter downward toward the bottom, compared to an upper end portion and a central portion. In the lower end portion of the flavored liquid discharge line 143, a jet 142 is formed to discharge the flavored liquid 121 therethrough.

Also, as illustrated in FIGS. 5 and 6, the membrane discharge line 145 is provided as a plurality of membrane discharge lines in a circumferential direction of the nozzle body 141 in the outer side of the flavored liquid discharge line 143. The membrane discharge line 145 is connected to the membrane tank 110 through the membrane supply line 117 to supply the membrane 111 in a direction, for example, a B direction as illustrated, in which the membrane discharge line 145 is formed. The membrane 111 passing through the membrane discharge line 145 wraps an outer surface of the flavored liquid 121 while passing through a jet formed in a lower end portion of the membrane discharge line 145.

Thus, the flavored liquid 121 and the membrane 111 are discharged simultaneously through the jet 142 of the flavored liquid discharge line 143 and the jet of the membrane discharge line 145, respectively. Here, the membrane 111 wraps the outer surface of the flavored liquid 121 in an area of the jet 142, thereby forming the initial form of the flavor capsule 101 as illustrated in FIG. 4. Although not illustrated, the initial form may be a long oval shape, which may change to a circular shape by being affected by the coolant while passing through the flavor capsule transfer line 190.

In addition, the nozzle 140 may be designed based on a size of the flavor capsule 101.

TABLE 2

| Capsule Classification | Diameter | Inner diameter/ Outer diameter | Outer diameter/ Inner diameter | Difference between inner and outer diameters | Membrane thickness immediately after forming |
|---|---|---|---|---|---|
| First type | 2.1 mm-2.3 mm | 0.5 mm | 2.0 mm | 1.5 mm | 0.58 mm-0.62 mm |
| Second type | 2.8 mm-3.0 mm | 0.8 mm | 3.0 mm | 2.2 mm | 0.68 mm-0.70 mm |
| Third type | 3.2 mm-3.4 mm | 0.8 mm | 3.4 mm | 2.6 mm | 0.70 mm-0.74 mm |
| Fourth type | 4.5 mm-4.7 mm | 1.8 mm | 4.7 mm | 2.9 mm | 0.74 mm-0.86 mm |

As illustrated in Table 2 above, a size of the flavor capsule 101 and a structure of the nozzle 140 may change based on a type of the cigarette 1. That is, an inner diameter and an outer diameter of the nozzle body 141 forming the flavored liquid discharge line 143 may be determined based on the size of the flavor capsule 101. As illustrated in Table 2, in a case in which a diameter of the flavor capsule 101 is 2.1 mm to 4.7 mm, the inner diameter and the outer diameter of the nozzle body 141 may be 0.5 mm to 1.8 mm and 2.0 mm to 4.7 mm, respectively. It may be desirable that the inner diameter is 20% to 40% of the diameter of the flavor capsule 101, and a ratio of the inner diameter to the outer diameter may be two and one half to five (2.5:5). In addition, a thickness of the membrane 111 may be 0.5 mm to 0.8 mm.

For example, as illustrated, in a case in which the cigarette 1 is of a first type, for example, a super-slim type, the diameter of the flavor capsule 101 may be 2.8 mm to 3.0 mm, and the outer diameter and the inner diameter of the nozzle 140 may be 3.0 mm and 0.8 mm, respectively. In addition, a thickness of the membrane 111 immediately after forming may be 0.68 mm to 0.72 mm.

As described, the nozzle 140 may be designed to have an outer diameter and an inner diameter that are optimized based on a size of the flavor capsule 101, and a size of the membrane discharge line 145 may also be designed such that the membrane 111 has an optimized thickness.

The initial form of the flavor capsule 101 that is discharged by the nozzle 140 is transferred along the flavor capsule transfer line 190. Here, the MCT solution 131 flows along the flavor capsule transfer line 190, and thus the flavor capsule 101 is transferred toward the capsule storage 180 while being cooled along the flow of the MCT solution 131. That is, the MCT solution 131 forms such a flow, and the flavor capsule 101 is transferred along the formed flow.

As described above, the MCT solution 131 is supplied by the MCT tank 130. The MCT tank 130 and an upper end portion of the flavor capsule transfer line 190, which is adjacent to the nozzle 140, are connected through the MCT supply line 137 such that the MCT solution 131 is supplied to an inlet portion of the flavor capsule transfer line 190, which is a portion to which the flavor capsule 101 is discharged from the nozzle 140. Through such a structure, the MCT solution 131, or the coolant, may directly affect the flavor capsule 101 that is discharged from the nozzle 140, and thus the flavor capsule 101 may be cooled. Thus, surface bonding of the membrane 111 to the flavored liquid 121 may be more firmly performed.

In addition, the flavor capsule 101 and the MCT solution 131 that are transferred through the flavor capsule transfer line 190 are separated by a capsule separator 170, instead of being transferred immediately to the capsule storage 180 and, thus, the flavor capsule 101 is then transferred to the capsule storage 180 and the MCT solution 131 is transferred back to the MCT tank 130.

As illustrated in FIG. 4, the capsule separator 170 includes an MCT storage tank 171 in which the MCT solution 131 is temporarily stored, and a separation plate 173 slantly disposed in an upper end portion of the MCT storage tank 171 and configured to transfer the flavor capsule 101 to the capsule storage 180 and allow the MCT solution 131 to permeate the MCT storage tank 171.

The separation plate 173 is tilted downward in a direction of the capsule storage 180 such that the flavor capsule 101 transferred through the flavor capsule transfer line 190 is dropped into the capsule storage 180. Here, the MCT solution 131 transferring the flavor capsule 101 may also be dropped together with the flavor capsule 101. However, according to an example embodiment, due to the separation plate 173 being provided so as to have permeability, the MCT solution 131 may be dropped into the MCT storage tank 171.

Referring to FIG. 4, the MCT storage tank 171 is connected to the MCT tank 130 through a connection line 175, and thus the MCT solution 131 that is temporarily stored in the MCT storage tank 171 is transferred again to the MCT tank 130. Thus, the MCT solution 131 may be reusable through such a circulation structure that may be effective in terms of cost reduction. The MCT tank 130 includes a cooler 133 to cool the MCT solution 131 stored in the MCT tank 130, and thus the cooled MCT solution 131 may be supplied to the flavor capsule transfer line 190.

Hereinafter, the capsule manufacturing step S200 to be performed by the flavor capsule manufacturing apparatus 100 will be described in detail.

Referring back to FIG. 3, the capsule manufacturing step S200 includes a defoaming step S210 of defoaming air bubbles from the membrane 111 manufactured in the membrane manufacturing step S100, a supplying step S220 of supplying the membrane 111, the flavored liquid 121, and the MCT solution 131 through the respective supply lines; a capsule forming step S230 of forming the flavor capsule 101 by wrapping the flavored liquid 121 with the membrane 111 by the nozzle 140; and a capsule transferring step S240 of transferring the flavor capsule 101 to the capsule storage 180 using the flow of the MCT solution 131 that is formed along the flavor capsule transfer line 190.

In the defoaming step S210, the membrane 111 manufactured in the membrane manufacturing step S100 is injected into a defoaming tank and air bubbles are defoamed from the membrane 111 by a defoamer. The defoaming step S210 may be performed in a vacuum for approximately 40 minutes. Here, it is obvious that the defoaming step may be performed on the flavored liquid 121 stored in the flavored liquid tank 120.

In the supplying step S220, the flavored liquid 121, the membrane 111, and the MCT solution 131 are supplied. Here, a steady velocity may change in an order of the flavored liquid 121, the membrane 111, and the MCT solution 131, starting from the flavored liquid 121. Using the respective pumps 118, 128, and 138, a supply speed of each of the membrane 111, the flavored liquid 121, and the MCT solution 131 may be set to be high, and then the membrane 111, the flavored liquid 121, and the MCT solution 131 may be supplied in the sequential order described in the foregoing. The supplying step may be performed in the sequential order to prevent generation of air bubbles.

In the capsule forming step S230, the flavored liquid 121 supplied from the flavored liquid tank 120 by the nozzle 140 is wrapped with the membrane 111 supplied from the membrane tank 110, and thus the flavor capsule 101 of the initial form is discharged from the nozzle 140.

That is, the flavored liquid 121 is wrapped with the membrane 111 when the flavored liquid 121 and the membrane 111 are discharged through jet portions after passing through respective paths of the nozzle 140, and thus the flavor capsule 101 of the initial form may be discharged.

In the capsule transferring step S240, the flavor capsule 101 discharged from the nozzle 140 is transferred toward the capsule storage 180 using the flow of the MCT solution 131 that is formed along the flavor capsule transfer line 190. Here, the MCT solution 131 cools the flavor capsule 101 such that the membrane 111 is more firmly bound to the flavored liquid 121.

Subsequently, the flavor capsule 101 and the MCT solution 131 are separated from each other by the capsule separator 170 as described above, and the separated flavor capsule 101 is transferred to the capsule storage 180 and temporarily stored therein.

In the hardening step S300, the flavor capsule 101 manufactured in the capsule manufacturing step S200 is first hardened. Here, the hardening is performed using a prepared ethanol (EtOH) solution. The prepared EtOH solution may be 70% to 100%, and a ratio of the prepared EtOH solution to the flavor capsule 101 may be one to one (1:1) to one to two (1:2), or more desirably, one to one and one half (1:1.5). However, the ratio is not limited to the example ratio described in the foregoing.

In the drying step S400, the hardened flavor capsule 101 is dried by a dryer. The drying of the flavor capsule 101 is performed at a set temperature, humidity, air flow, or rotation speed.

In the additional hardening step S500, the flavor capsule 101 is additionally hardened to prevent moisture absorption of the dried flavor capsule 101. A prepared EtOH solution used in this step as a hardening agent may be prepared by mixing ethanol and distilled water at a ratio of four to six (4:6) to seven to three (7:3). The distilled water may include 0.5% to 1.5% calcium chloride. For example, based on such a mixing ratio, a solution prepared by mixing 10 to 14 kilograms (kg) of ethanol, 7.92 kg of distilled water, and 0.08 kg of calcium chloride (or 1% calcium chloride) may be used for 10 kg of the flavor capsule 101 to be additionally hardened. Such an additional hardening may be performed to prevent the flavor capsule 101 from absorbing moisture.

In the cleaning step S600, the additionally hardened flavor capsule 101 is cleaned by a stirring cleaner. Here, 90% to 98% ethanol may be used as a cleaning solution, but a concentration of the ethanol is not limited thereto.

The flavor capsule 101 cleaned in the cleaning step S600 is dried by a dryer such as an electric dryer for a set period of time, transferred to a drying chamber with a temperature of 22° C. and humidity of 45%±5%, and then balanced and stored in a drying plate.

In addition, in a sorting step, among the flavor capsule 101, a flavor capsule that satisfies a standard is first sorted by a size sorter, and then a faulty flavor capsule is sorted out by a naked-eye sorter.

In the packing step S700 after the sorting is completed, the flavor capsule 101 that is normal is packed.

Hereinafter, a viscosity and a temperature of the membrane 111 will be described in greater detail.

As described above, the viscosity of the membrane 111 may be important when manufacturing the flavor capsule 101 by wrapping the flavored liquid 121 with the membrane 111. Thus, it is required to maintain a viscosity of the membrane 111 at a time of manufacturing the membrane 111, a temperature of the membrane tank 110, and a temperature of the membrane supply line 117 to maintain an appropriate viscosity of the membrane 111. In addition, it is also required that the coolant, for example, the MCT solution 131 as described herein, needs to be maintained in a set range.

Although not illustrated, the membrane 111 is manufactured by a membrane manufacturer. Here, the viscosity of the membrane 111 is maintained to be 300 cps to 700 cps, the temperature of the membrane tank 110 is maintained to be 55° C. to 75° C., the temperature of the membrane supply line 117 and the nozzle 140 is maintained to be 55° C. to 75° C., and the temperature of the MCT solution 131 is maintained to be 12° C. to 18° C. Thus, the viscosity of the membrane 111 may be maintained.

The viscosity of the membrane 111 at a time of manufacturing the membrane 111 is more desirably 500 cps to 650 cps, and a viscosity of the membrane 111 discharged from a tank of the membrane manufacturer is 400 cps to 550 cps. Here, the temperature of the membrane tank 110 is maintained to be 60° C. to 65° C., and the temperature of the membrane supply line 117 and the nozzle 140 is maintained to be 60° C. to 70° C.

As described above, the membrane 111 and the flavor capsule 101 are manufactured through a series of processes, and thus efficiency in the process of manufacturing the flavor capsule 101 may be improved. In addition, the flavor capsule 101 may be manufactured with the membrane 111 being appropriately bound to the flavored liquid 121 and, thus, a tearing or a burst of the flavor capsule 101 may be prevented to achieve stability. In addition, the flavor capsule 101 may be torn by an external force applied by a user, and thus provide the user with reliability.

In addition, a dual discharge structure in which the flavored liquid 121 and the membrane 111 are discharged through respective discharge paths may be provided and, thus, an initial form of the flavor capsule 101 may be obtained when the flavored liquid 121 and the membrane 111 are discharged through the respective discharge paths. Thus, the efficiency in the method of manufacturing the flavor capsule 101 may be improved.

In addition, in a process of manufacturing and transferring the membrane 111, a viscosity and a temperature of the membrane 111 may be maintained and, thus, production stability and formability of the flavor capsule 101 may be secured.

Further, the membrane discharge line may be provided as a plurality of membrane discharge lines disposed on the outer side of the flavored liquid discharge line, but not limited thereto. The membrane discharge lines may be provided to have a cross section of a circular band shape in the outer side of the flavored liquid discharge line, to discharge the membrane.

Although a few example embodiments have been shown and described, the present disclosure is not limited to the described example embodiments. Instead, it would be appreciated by those skilled in the art that changes may be made to these example embodiments without departing from the principles and spirit of the invention, the scope of which is defined by the claims and their equivalents.

The invention claimed is:

1. A method of manufacturing a flavor capsule of a cigarette, the method comprising:
   manufacturing a membrane of the flavor capsule by a membrane manufacturer configured to manufacture a membrane;
   wherein manufacturing the membrane comprises;
      weighing an amount of each substance included in the membrane; and
      forming the membrane by dissolving the substances included in the membrane;
      wherein the substances included in the membrane and to be weighed include agar, pectin, glycerin, and sodium alginate, and
      wherein a weight percentage of the agar is 1.5% to 3.0%, a weight percentage of the pectin is 1% to 3%, a weight percentage of the glycerin is 2.0% to 10.0%, and a weight percentage of the sodium alginate is 0.2% to 0.7%;
   manufacturing the flavor capsule by an apparatus for manufacturing the flavor capsule, using the manufactured membrane and a flavored liquid to be contained in the membrane; and
   hardening the flavor capsule.

2. The method of claim 1, wherein, in the forming of the membrane, the agar is injected into hot water and dissolved therein, the glycerin is dissolved therein, the pectin is dissolved therein, and then the sodium alginate is dissolved therein.

3. The method of claim 1, wherein the manufacturing of the membrane further comprises measuring a viscosity of the formed membrane to check whether the viscosity of the formed membrane is within a set range of 500 to 650 centipoise (cps).

4. The method of claim 1, wherein the apparatus for manufacturing the flavor capsule comprises:
   a membrane tank in which the membrane is stored, a flavored liquid tank in which the flavored liquid is stored, and a coolant tank in which a coolant is stored;
   a membrane supply line connected to the membrane tank, a flavored liquid supply line connected to the flavored liquid tank, and a coolant supply line connected to the coolant tank;
   a nozzle connected to the membrane supply line and the flavored liquid supply line, and configured to form an initial form of the flavor capsule by discharging the membrane and the flavored liquid such that the membrane wraps the flavored liquid; and
   a flavor capsule transfer line connected to the nozzle to transfer the flavor capsule discharged from the nozzle by each unit, and connected to the coolant supply line to allow the flavor capsule to be transferred by the coolant supplied by the coolant supply line,
   wherein the manufacturing of the flavor capsule comprises:
      supplying the membrane, the flavored liquid, and the coolant through the supply lines;
      forming the flavor capsule by allowing the flavored liquid to be wrapped by the membrane by the nozzle; and
      transferring the flavor capsule to a capsule storage using a flow of the coolant formed along the flavor capsule transfer line.

5. The method of claim 4, wherein the forming of the flavor capsule further comprises:
   defoaming air bubbles from the manufactured membrane before the supplying,
   wherein, in the supplying, a steady velocity of the flavored liquid, the membrane, and the coolant is changed in an order of the flavored liquid, the membrane, and the coolant, starting from the flavored liquid.

6. The method of claim 1, wherein the hardening comprises:
   hardening the flavor capsule by mixing the formed flavor capsule with a prepared ethanol (EtOH) solution,
   wherein the prepared EtOH solution includes 70 to 100% ethanol and
   the mixing is performed by mixing the flavor capsule and the prepared EtOH solution at a ratio of one to one (1:1) to one to two (1:2).

7. The method of claim 1, further comprising:
   drying the flavor capsule using a dryer after the hardening; and
   additionally hardening the flavor capsule to prevent moisture absorption after the drying.

8. The method of claim 7, further comprising:
   cleaning, by a stirring cleaner, the additionally hardened flavor capsule;
   sorting, by a size sorter, the cleaned flavor capsule; and
   packing the sorted flavor capsule.

9. The method of claim 2, wherein, in the forming of the membrane, the agar is dissolved in the hot water at a temperature of 85° C. to 100° C., the glycerin is dissolved in the hot water in which the agar is dissolved at a temperature of 80° C. to 85° C., the pectin is dissolved in the hot water in which the agar and the glycerin are dissolved at a temperature of 80° C. to 85° C., and the sodium alginate is dissolved in the hot water in which the agar, the glycerin, and the pectin are dissolved at a temperature of 75° C. to 80° C.

10. The method of claim 1, wherein the manufacturing of the membrane further comprises transferring the formed membrane to a membrane tank of the apparatus for manufacturing the flavor capsule.

11. The method of claim 7, wherein, in the additional hardening of the flavor capsule, an EtOH solution is prepared by mixing ethanol and distilled water at a ratio of four to six (4:6) to seven to three (7:3), and the distilled water includes 0.1% to 5.0% calcium chloride.

* * * * *